United States Patent
Iida et al.

(10) Patent No.: US 10,692,229 B2
(45) Date of Patent: Jun. 23, 2020

(54) RECESS DETECTION DEVICE, TRANSPORT DEVICE, AND RECESS DETECTING METHOD

(71) Applicant: MURATA MACHINERY, LTD., Kyoto-shi, Kyoto (JP)

(72) Inventors: Masaomi Iida, Kyoto (JP); Shoji Tanaka, Kyoto (JP)

(73) Assignee: MURATA MACHINERY, LTD., Kyoto (JP)

(*) Notice: Subject to any disclaimer, the term of this patent is extended or adjusted under 35 U.S.C. 154(b) by 194 days.

(21) Appl. No.: 15/924,552

(22) Filed: Mar. 19, 2018

(65) Prior Publication Data
US 2018/0293743 A1   Oct. 11, 2018

(30) Foreign Application Priority Data
Apr. 5, 2017  (JP) .................................. 2017-075579

(51) Int. Cl.
| | |
|---|---|
| G06T 7/50 | (2017.01) |
| G06T 7/00 | (2017.01) |
| G05D 1/02 | (2020.01) |
| H04N 13/239 | (2018.01) |
| B66F 9/075 | (2006.01) |

(52) U.S. Cl.
CPC .............. G06T 7/50 (2017.01); B66F 9/0755 (2013.01); G05D 1/0246 (2013.01); G06T 7/0008 (2013.01); H04N 13/239 (2018.05); G06T 2207/30164 (2013.01)

(58) Field of Classification Search
CPC .......... B66F 9/00; B66F 9/063; B66F 9/0755; G06T 7/50; G05D 1/0246; H04N 13/239
See application file for complete search history.

(56) References Cited

U.S. PATENT DOCUMENTS

| | | | | |
|---|---|---|---|---|
| 2014/0362184 A1* | 12/2014 | Jovanovski | ............. | G01S 7/497 348/46 |
| 2015/0294473 A1* | 10/2015 | Michot | ................... | G06T 5/005 382/154 |
| 2015/0347840 A1* | 12/2015 | Iida | ...................... | G06K 9/4647 382/103 |

(Continued)

FOREIGN PATENT DOCUMENTS

| | | |
|---|---|---|
| JP | 2006-301962 A | 11/2006 |
| JP | 2017-015601 A | 1/2017 |

Primary Examiner — Nay A Maung
Assistant Examiner — Jose M Torres
(74) Attorney, Agent, or Firm — Keating & Bennett, LLP

(57) ABSTRACT

A recess detection device includes a reference value decision processor that extracts, from distance image information, pieces of reference information respectively corresponding to reference regions at different positions within a detection range with a distance from a three-dimensional sensor being within a predetermined range, and determines a reference value based on the reference information, and a presence identification processor that extracts, from the distance image information, pieces of comparison information respectively corresponding to comparison regions within the same detection range, respectively, derives comparison values based on the respective pieces of comparison information, and indicates a presence of a recess when a difference between the reference value and the comparison value exceeds a predetermined threshold.

16 Claims, 9 Drawing Sheets

(56) References Cited

U.S. PATENT DOCUMENTS

| | | | |
|---|---|---|---|
| 2016/0090283 A1* | 3/2016 | Svensson | B66F 9/14 |
| | | | 701/50 |
| 2017/0285644 A1* | 10/2017 | Ichinose | G01S 17/08 |
| 2017/0316253 A1* | 11/2017 | Phillips | G06T 7/74 |
| 2018/0089517 A1* | 3/2018 | Douglas | G06T 7/593 |
| 2018/0089616 A1* | 3/2018 | Jacobus | G05D 1/0246 |
| 2018/0155169 A1* | 6/2018 | Tanaka | B66F 9/24 |

\* cited by examiner

RECESS DETECTION DEVICE, TRANSPORT DEVICE, AND RECESS DETECTING METHOD

CROSS REFERENCE TO RELATED APPLICATIONS

This application claims the benefit of priority to Japanese Patent Application No. 2017-075579 filed on Apr. 5, 2017. The entire contents of this application are hereby incorporated herein by reference.

BACKGROUND OF THE INVENTION

1. Field of the Invention

The present invention relates to a recess detection device, a transport device, and a recess detecting method to detect whether or not a recess is present on a predetermined surface.

2. Description of the Related Art

There have been proposed a variety of methods to acquire distance image information respectively including pieces of distance information in a plurality of two-dimensionally disposed points constituting an image by using a three-dimensional sensor such as a TOF (Time of Flight) camera, an LRF (Laser Range Finder) or a stereo camera, and inspection is made as to whether foreign matter or a recess is located on a predetermined plane such as a floor surface or an upper surface of a cardboard box stacked on the floor surface.

For example, Japanese Unexamined Patent Publication No. 2006-301962 describes a technique in which, from a setting of a position in a two-dimensional coordinate system formed by excessively dividing captured distance image information into regions and taking a depth distance as vertical axis coordinates, a plurality of objects, images of which have been captured, are separated.

When foreign matter located on a predetermined surface is to be detected using the three-dimensional sensor, the foreign matter can be easily identified because the shape of the foreign matter is present as a point group at a position different from the predetermined surface in the distance image information. However, when a portion of the predetermined surface is recessed, only the density of the point group of the distance image information decreases and a remarkable point group indicating the recess does not appear, which may cause the recess to be overlooked or undetected.

SUMMARY OF THE INVENTION

Preferred embodiments of the present invention provide recess detection devices to detect with high accuracy a recess in a portion of a plane, transport devices each including the recess detection device, and recess detecting methods.

A recess detection device according to a preferred embodiment of the present invention is a recess detection device to detect a recess, which may be present in a flat portion intersecting with a visual field plane of a three-dimensional sensor, based on distance image information of a detection target including the flat portion, the recess detection device including: a reference value decision processor that extracts, from the distance image information, a plurality of pieces of reference information respectively corresponding to a plurality of reference regions set at different positions within a certain detection range in the flat portion with a distance from the three-dimensional sensor being within a predetermined range, and determines a reference value based on the plurality of pieces of reference information; and a presence identification processor that extracts, from the distance image information, pieces of comparison information respectively corresponding to a plurality of comparison regions within the detection range in the flat portion, respectively derives comparison values based on the respective pieces of comparison information, and indicates a presence of a recess when a difference between the reference value and the comparison value exceeds a predetermined threshold.

Accordingly, for example, in a plane including the flat portion of the detection target, a plurality of reference regions are defined within a detection range which is a fan-shaped arched region sandwiched between two concentric circles centered on a sensor origin, a reference value is calculated from a plurality of pieces of reference information obtained from the reference region, and a comparison value is calculated from comparison information obtained from a comparison region set within the same detection range, so that a comparison value is evaluated based on the reference value. Hence, it is possible to detect the recess with high accuracy without being affected by the distance image information in which the density gradually decreases and a noise amount relatively increases with increasing distance from the three-dimensional sensor.

Further, the reference regions may be evenly disposed along the detection range in the flat portion.

Accordingly, even when the amount of information extracted from the distance image information is reduced, erroneous detection of the recess is able to be prevented.

Further, the reference regions may be regions obtained by evenly dividing the detection range in the flat portion.

Accordingly, the reference value is derived from all data in the reference region, thus enabling enhancement of the detection accuracy in the recess.

The reference region and the comparison region may be the same region.

Accordingly, since the reference information and the comparison information are the same, it is possible to simplify the operation of extracting these from the distance image information, and to improve the speed of detecting the recess.

Further, a flat portion identifier may be provided which acquires distance image information of a parallel portion that is a portion of the detection target along the visual field plane of the three-dimensional sensor, and identifies the position of the flat portion from the distance image information.

Accordingly, even when the shape of the detection target is unknown, the shape of the flat portion is able to be easily grasped based on the shape of the parallel portion. Hence it is possible to determine the detection region at high speed and to improve the speed of detection of the recess.

A transport device according to another preferred embodiment of the present invention includes a recess detection device that detects a recess which may be present in a flat portion intersecting with a visual field plane of a three-dimensional sensor, based on distance image information of a detection target including the flat portion; a vehicle, to which the recess detection device is attached, and which moves autonomously; and a holder that is attached to the vehicle and holds a placement target placed on the detection target. The recess detection device includes a reference value decision processor that extracts, from the distance image information, a plurality of pieces of reference information respectively corresponding to a plurality of reference regions set at different positions within a certain detection range in the flat portion with a distance from the three-dimensional sensor being within a predetermined range, and determines a reference value based on the plurality of pieces of reference information; and a presence identification processor that extracts, from the distance image information, pieces of comparison information respectively corresponding to a plurality of comparison regions within the detection range in the flat portion, respectively derives comparison values based on the respective pieces of comparison information, and indicates a presence of a recess when a difference between the reference value and the comparison value exceeds a predetermined threshold.

Accordingly, it is possible to detect the recess at high speed and with high accuracy, and to effectively avoid placing a load on the flat portion where the recess is present.

Further, the holder may include a plurality of forks, the recess detection device may include a plurality of three-dimensional sensors, and each of the three-dimensional sensors may be attached to each of tips of the forks and attempt to detect a recess.

Hence, it is possible to change the height of the three-dimensional sensor, and to detect the recess with higher accuracy.

A recess detecting method according to another preferred embodiment of the present invention is a method for detecting a recess, which may be present in a flat portion intersecting with a visual field plane of a three-dimensional sensor, based on distance image information of a detection target having the flat portion, the recess detecting method including: causing a reference value decision processor to extract, from the distance image information, a plurality of pieces of reference information respectively corresponding to a plurality of reference regions set at different positions within a certain detection range in the flat portion with a distance from the three-dimensional sensor being within a predetermined range; causing the reference value decision processor to determine a reference value based on the plurality of pieces of reference information; causing a presence identification processor to extract, from the distance image information, pieces of comparison information respectively corresponding to a plurality of comparison regions within the detection range in the flat portion; causing the presence identification processor to derive comparison values based on the respective pieces of comparison information, and causing the presence identification processor to indicate a presence of a recess when a difference between the reference value and the comparison value exceeds a predetermined threshold.

Accordingly, for example, in a plane including the flat portion of the detection target, a plurality of reference regions are defined within a detection range which is a fan-shaped arched region sandwiched between two concentric circles centered on a sensor origin, a reference value is calculated from a plurality of pieces of reference information obtained from this reference region, and a comparison value is calculated from comparison information obtained from a comparison region set within the same detection range, so that a comparison value is able to be evaluated based on the reference value. Hence, it is possible to detect the recess with high accuracy without being affected by the distance image information in which the density gradually decreases and a noise amount relatively increases with increasing distance from the three-dimensional sensor.

Note that general or specific aspects, features, functions or elements of the various preferred embodiments of the present invention may be realized by a device, an integrated circuit, a computer program, or a computer-readable recording medium such as a CD-ROM, or may be realized by freely selected combination of the device, the integrated circuit, the computer program, and the recording medium.

The recess detection devices, the transport devices, and the recess detecting methods according to preferred embodiments of the present invention accurately detect a recess or recesses in a flat portion of a detection target.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of recess detection devices, transport devices, and recess detecting methods according to the present invention will be described with reference to the drawings. Note that the following preferred embodiments only show examples of the recess detection devices, the transport devices, and the recess detecting methods according to the present invention. Accordingly, the scope of the present invention is defined by the wording of the claims with reference to the following preferred embodiments, and is not limited to only the following preferred embodiments. Therefore, among the elements and features in the following preferred embodiments, the elements and features not recited in the independent claims showing the top level concepts of preferred embodiments of the present invention are not necessarily required in the present invention, but will be described as a preferred form.

Further, the drawings are schematic views in which emphasis, omission, or ratio adjustment are performed as appropriate in order to show preferred embodiments of the present invention, and an actual shape, positional relationship, and ratio may be different in some cases.

First, a detection target 300 and a placement target 310 used in the present preferred embodiment will be described.

Figure 1:
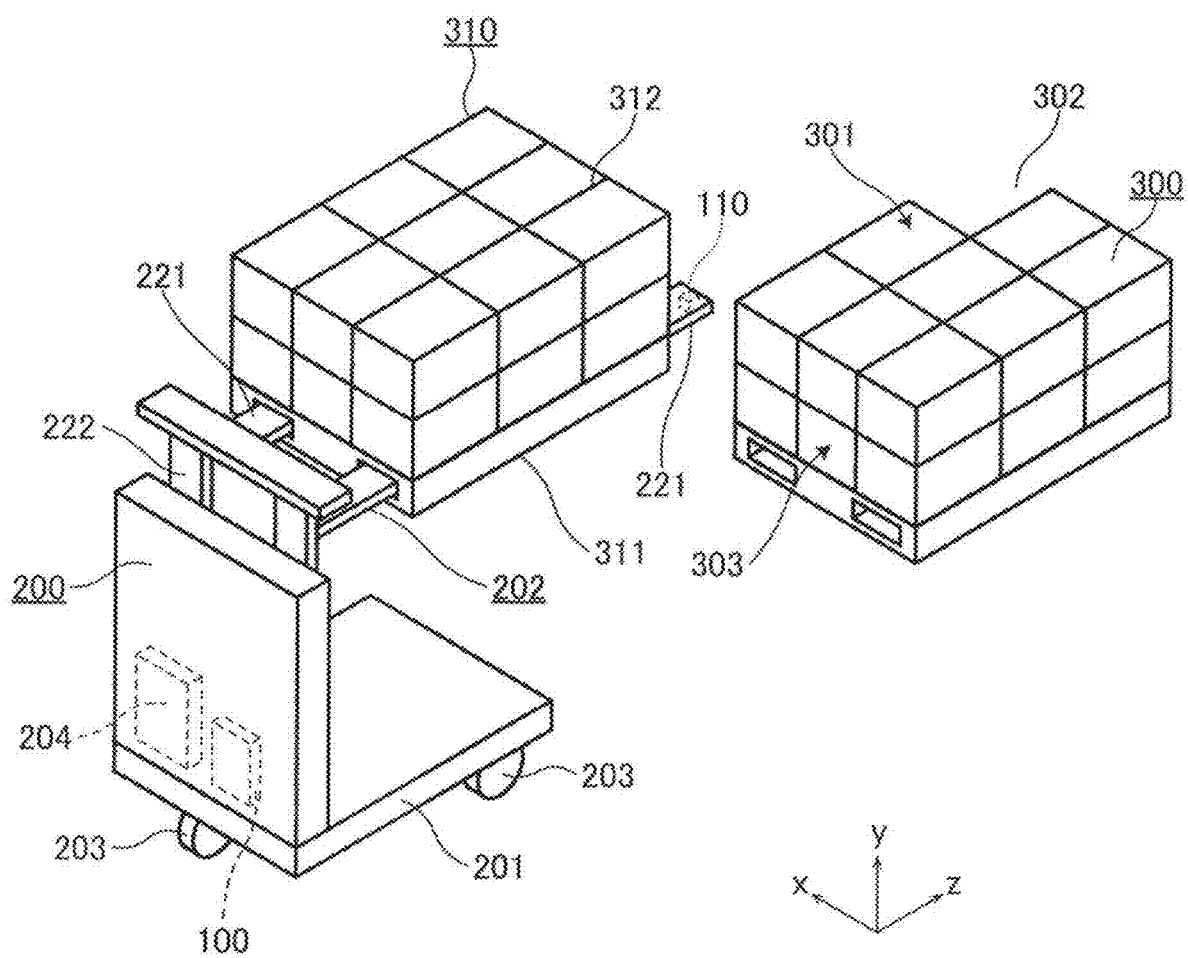
FIG. 1 is a perspective view illustrating a transport device, a detection target, and a placement target.

FIG. 1 is a perspective view illustrating a transport device, a detection target, and a placement target.

As illustrated in FIG. 1, the placement target 310 is a target to be transported by a transport device 200 and transferred to a predetermined position. In the placement target 310 illustrated in FIG. 1, a plurality of boxes 312 arranged in a matrix within a horizontal plane are vertically stacked and arranged on a pallet 311, but the placement target 310 is not particularly limited.

The detection target 300 preferably is an object on which the placement target 310 is placed by the transport device 200. The detection target 300 is not particularly limited, and the detection target 300 also includes the floor surface on which the transport device 200 travels. In the case of the present preferred embodiment, the detection target 300 preferably is an object similar to the placement target 310, and preferably includes the pallet 311 and the plurality of boxes 312 stacked in a cubic shape on the pallet 311. Further, the detection target 300 may also be an object including a flat portion 301 that intersects with a visual field plane 199 (cf. FIG. 3) of a three-dimensional sensor 110 described later, such as a surface portion on the upper surface of the plurality of stacked boxes 312 and a portion of the floor surface.

Next, an outline of the configuration of the transport device 200 will be described.

As illustrated in FIG. 1, the transport device 200 is a device that moves autonomously (e.g., an unmanned device) to the front of the detection target 300 and places the placement target 310 on the detection target 300 when the flat portion 301 being the upper surface of the detection target 300 is in a state where the placement target 310 can be placed, for example, in a state where there is no recess 302, and the transport device 200 includes a recess detection device 100, a vehicle 201, a holder 202, and a controller 204.

The controller 204 is configured or programmed to detect or determine its own position in a traveling target such as a rail or the floor surface and detect or determine the relative positional relationship with respect to the detection target 300. The controller 204 is also configured or programmed to cause wheels 203 attached to the vehicle 201 to operate and autonomously move by controlling a driving device (not illustrated) based on information on its position. In addition, the controller 204 also is configured or programmed to control such as raising and lowering of the holder 202 so as to hold or release the placement target 310.

The vehicle 201 is a device that preferably is provided with the recess detection device 100 and the holder 202, the controller 204, the driving device (not illustrated), and the like, and travels along the traveling target under control of the controller 204.

The holder 202 is attached to the vehicle 201 and holds the placement target 310 placed on the detection target 300. In the case of the present preferred embodiment, the holder 202 preferably includes two forks 221 disposed parallel or substantially parallel to each other, parallel or substantially parallel to the floor surface on which the transport device 200 travels, and a mast 222 that allows vertical movement of the two forks 221 while holding the parallel or substantially parallel position of two forks 221 to the floor surface. The holder 202 is able to respectively insert the two forks 221 into holes provided at a plurality of places of the pallet 311 of the placement target 310 and lift the placement target 310 with the forks 221, to hold the placement target 310 in a supported state. Further, the holder 202 is able to place the held placement target 310 on, for example, the upper surface or the floor surface of the detection target 300 and pull out the forks 221 from the pallet 311, to cancel the holding of the placement target 310.

Note that the holder 202 is not limited to the forks 221, but may be exemplified by a structure holding the placement target 310 from the side or a structure suspending and holding the placement target 310.

Figure 2:
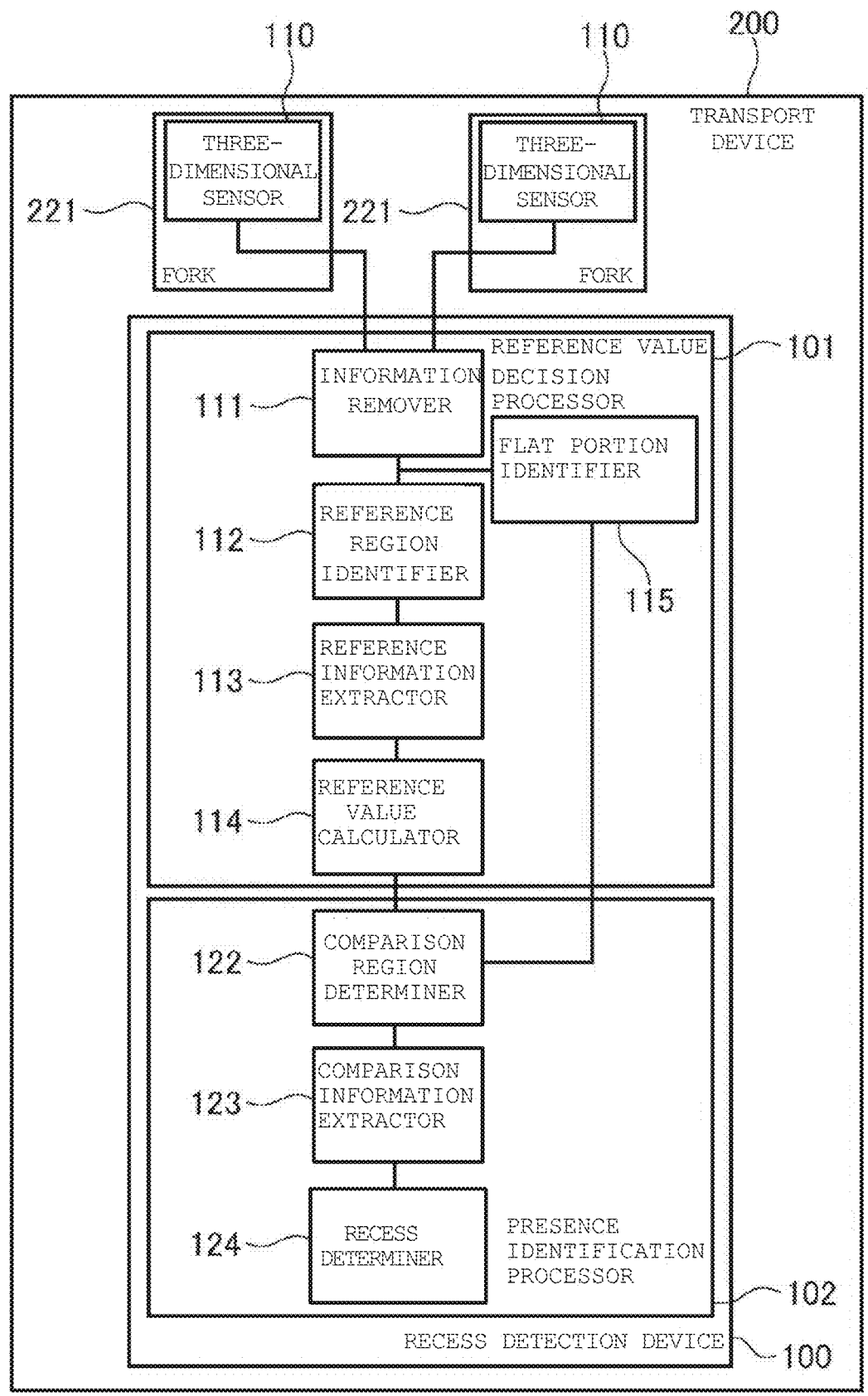
FIG. 2 is a block diagram illustrating a functional configuration of a recess detection device together with a mechanism configuration.

FIG. 2 is a block diagram illustrating a functional configuration of the recess detection device together with a mechanism configuration.

Figure 3:
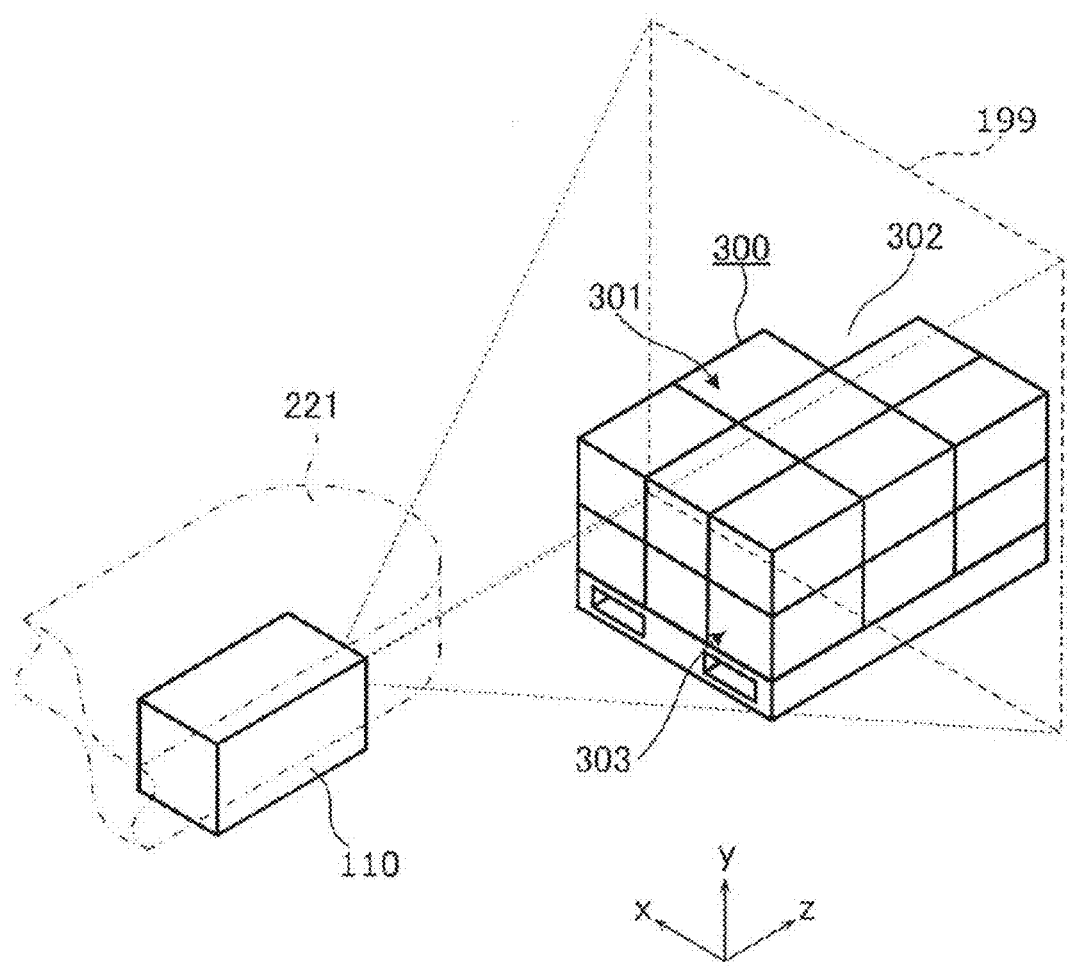
FIG. 3 is a perspective view illustrating a relationship between a three-dimensional sensor and a detection target.

FIG. 3 is a perspective view illustrating a relationship between a three-dimensional sensor and a detection target.

Figure 4:
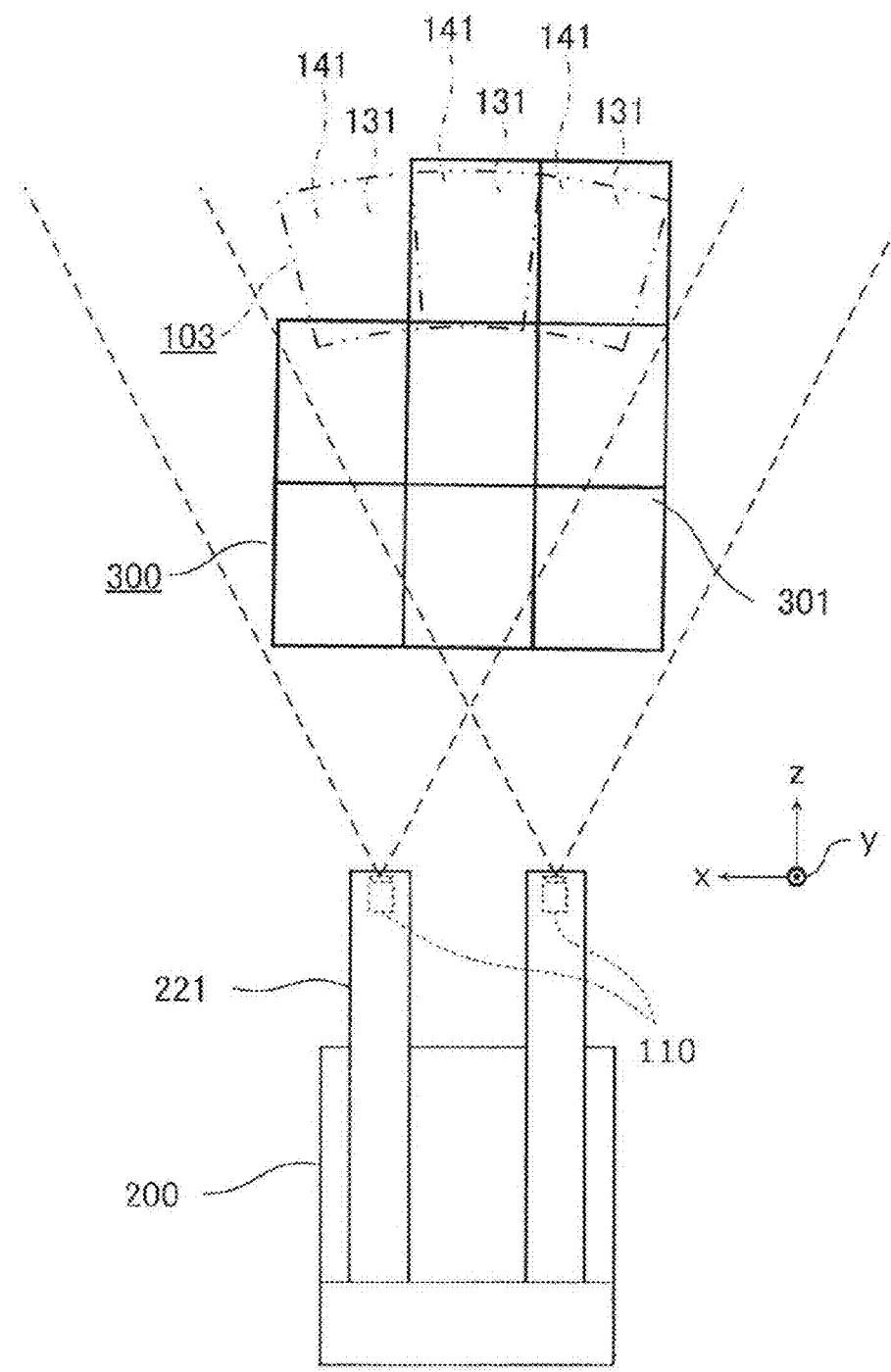
FIG. 4 is a plan view illustrating a relationship between a transport device and the detection target.

FIG. 4 is a plan view illustrating a relationship between a transport device and the detection target.

As illustrated in these figures, the recess detection device 100 is a device that detects the recess 302 which may be present in the flat portion 301, intersecting with the visual field plane 199 of the three-dimensional sensor 110 attached to the tip of each of the two forks 221 as the holder 202, based on distance image information of the detection target 300 including the flat portion 301. The recess detection device 100 includes a reference value decision processor 101 and a presence identification processor 102.

The reference value decision processor 101 and the presence identification processor 102 preferably are each or collectively implemented with a processor and a memory provided in a computer. The memory preferably is a volatile semiconductor memory, a nonvolatile semiconductor memory, a hard disk drive, or the like.

In the present preferred embodiment, the recess detection device 100 detects the recess 302 based on distance image information obtained from the two three-dimensional sensors 110, but in the following description, pieces of distance image information obtained from the two three-dimensional sensors 110 are synthesized and treated as information obtained from one three-dimensional sensor 110. Further, a synthesis stage is freely selectable, such as whether the plurality of distance image information obtained from the plurality of three-dimensional sensors 110 are synthesized at an initial stage or whether the pieces of distance image information are separately processed and then synthesized.

In the present preferred embodiment, a direction in which the three-dimensional sensor 110 is directed (a depth direction) is taken as a Z-axis direction. A range that is vertical to the direction in which the three-dimensional sensor 110 is directed and that is able to be detected by the three-dimensional sensor 110 is taken as a visual field plane 199 (XY plane). A first direction (a horizontal direction or a lateral direction) which is a vertical direction to the Z-axis direction and in which the two forks 221 are arranged is taken as an X-axis direction, and a second direction (a perpendicular direction or a vertical direction) vertical to the Z-axis direction and the X-axis direction is taken as a Y-axis direction.

In the Z-axis direction, with the three-dimensional sensor 110 as a reference, the depth side of the three-dimensional sensor 110 is taken as a Z-axis direction positive side and the front side thereof is taken as a Z-axis direction negative side. In the X-axis direction, the left side as viewed from the three-dimensional sensor 110 is taken as an X-axis direction positive side and the right side is taken as an X-axis direction negative side. In the Y-axis direction, the upper side as viewed from the three-dimensional sensor 110 is taken as a Y-axis direction positive side and the lower side is taken as a Y-axis direction negative side. That is, in the figure, the side toward which an arrow is directed is the positive side in each direction and the opposite side is the negative side in each direction.

As illustrated in FIGS. 3 and 4, for example, the three-dimensional sensor 110 is a sensor capable of acquiring three-dimensional information indicating a three-dimensional position of each of points virtually dispersing in the flat portion 301 of the detection target 300 present within the visual field plane 199 (only one side is illustrated in FIG. 3) of the three-dimensional sensor 110. Note that the operation of the three-dimensional sensor 110 also includes acquiring three-dimensional information of each point in the flat portion 301 of the detection target 300 by processing two-dimensional information (image) obtained from one camera such as a stereo camera.

The three-dimensional information may be represented by orthogonal coordinates, or may be represented by polar coordinates or other coordinates.

Here, the distance image information is information obtained by adding information indicating a distance from the three-dimensional sensor 110 to each point in the flat portion 301 of the detection target 300 to a plurality of points indicating the detection target 300 present on the visual field plane 199 of the three-dimensional sensor 110, and is able to be derived from three-dimensional information, for example.

In the case of the present preferred embodiment, a TOF (Time Of Flight) camera is preferably used as the three-dimensional sensor 110, which acquires the distance image information by measuring the time from when a light emitting element (e.g., an LED) provided around the camera irradiates light such as infrared light to the detection target 300 to when an imaging element observes reflection of light from the detection target 300 for each imaging pixel of the imaging element to add the distance to the flat portion 301 of the detection target 300 to the two-dimensional position of the detection target 300 for each pixel.

As illustrated in FIGS. 3 and 4, the three-dimensional sensor 110 measures the time from when the light emitting element irradiates infrared light with pulse-wise in the Z-axis positive direction to when reflected light from the detection target 300 is returned to each pixel of the imaging element disposed on the XY plane. As a result, the three-dimensional sensor 110 measures a distance to each portion in the flat portion 301 of the detection target 300 so as to acquire the distance image information of two-dimensional position on the visual field plane 199 with the distance information added thereto. Note that any of the plurality of three-dimensional sensors 110 may have the same configuration, and as illustrated in FIG. 1, the distance image information is preferably acquired by measuring three-dimensional distances to a plurality of places in the flat portion 301 of the detection target 300.

Figure 5:
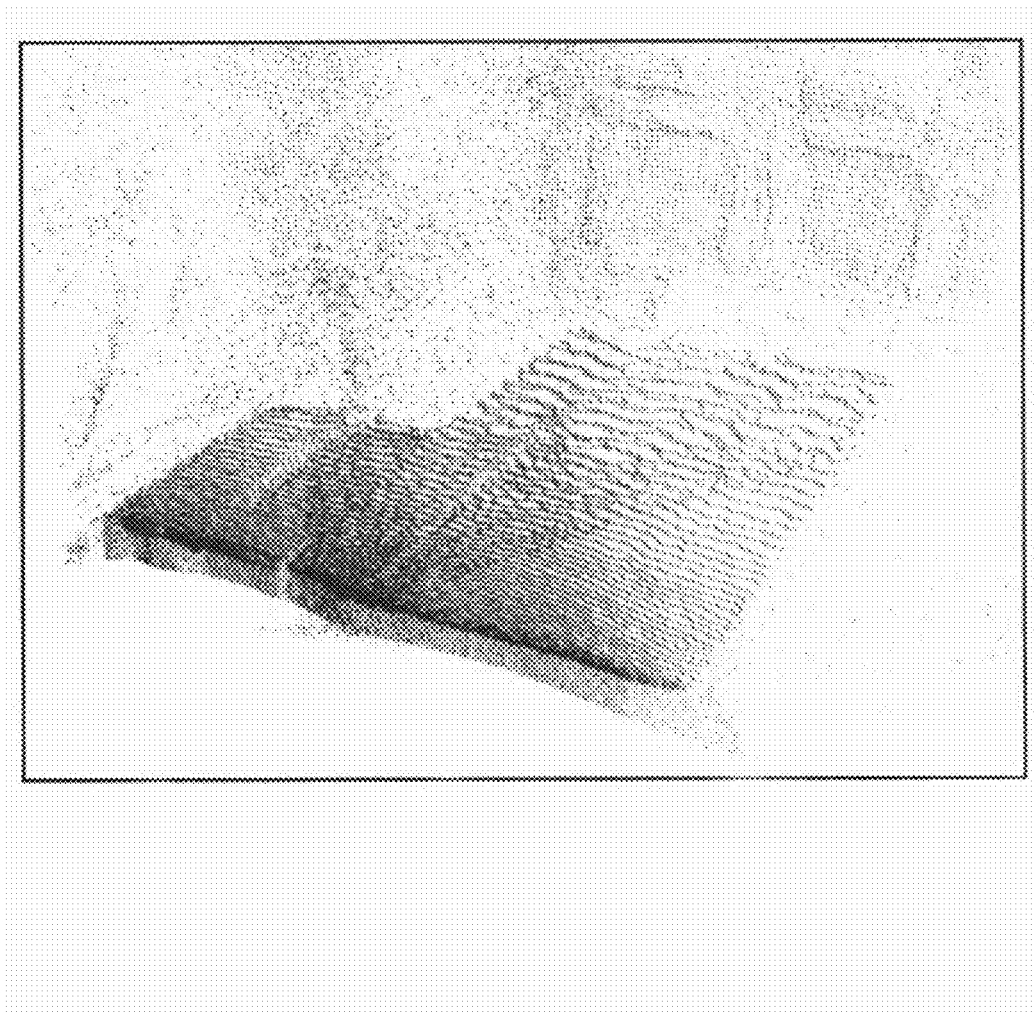
FIG. 5 is a view illustrating a two-dimensional image (point information) extracted from distance image information obtained from the three-dimensional sensor.

FIG. 5 is a view illustrating a two-dimensional image (point information) extracted from distance image information obtained from the three-dimensional sensor.

Each point illustrated in FIG. 5 is point information and shows a two-dimensional position within the visual field plane 199 on the surface of the detection target 300. In the distance image information, distance information is associated with each point illustrated in FIG. 5. As illustrated in FIG. 5, the three-dimensional sensor 110 outputs a large number of noises. In addition, the flat portion 301 disposed in an intersecting manner (orthogonal in the present preferred embodiment) with respect to the visual field plane 199 is in a state where an interval between points in the depth direction (the Z-axis direction in FIG. 3) in the two-dimensional image becomes wider with increasing distance from the three-dimensional sensor 110 due to the geometrical relationship. That is, the density of point information becomes lower with increasing distance from the three-dimensional sensor 110.

Further, the three-dimensional sensor 110 measures a distance or the like based on reflected light, so that a noise amount also increases or decreases depending on the reflectance of the flat portion 301 of the detection target 300.

In a preferred embodiment of the present invention, the distance information is excluded from the distance image information in such a situation, and focusing on the density of the points present in the two-dimensional image, the recess 302 is detected at relatively high speed.

In the present preferred embodiment, the visual field plane 199 of each three-dimensional sensor 110 is smaller than the detection target 300, so that the transport device 200 preferably includes two three-dimensional sensors 110 arranged in the horizontal direction. However, the present invention is not limited to the configuration including two three-dimensional sensors 110. That is, when a sensor having a sufficient measurement range with respect to the detection target 300 is adopted as the three-dimensional sensor 110, the transport device may include only one three-dimensional sensor 110. The two three-dimensional sensors 110 may be attached not only to the tip of the forks 221 but also to the left and right ends of the front side of the vehicle 201, respectively.

The three-dimensional sensor 110 may be an LRF (Laser rangefinder) or the like that scans laser beam and measures coordinates and distances of a plurality of places based on the reflected light of the laser beam.

The reference value decision processor 101 is a processor that is configured or programmed to create a reference value to be a reference to determine whether or not the recess 302 is present based on information obtained from the three-dimensional sensor 110, and is configured or programmed to include an information remover 111, a reference region identifier 112, a reference information extractor 113, and a reference value calculator 114. It is also possible for each of the information remover 111, the reference region identifier 112, the reference information extractor 113, and the reference value calculator 114 to be defined by a separate processor or processors independent from the reference value decision processor 101.

The information remover 111 is a processor that is configured or programmed to exclude information on a distance from distance image information obtained from the three-dimensional sensor 110, and extract point information including information on the position of a two-dimensional point as illustrated in FIG. 5. By the information remover 111 processing the distance image information, only the point information is processed after the processing by the information remover 111, and the amount of information is very small as compared with that of the distance image information obtained from the three-dimensional sensor 110, so that the subsequent processing is able to be executed at high speed.

As illustrated in FIG. 4, the reference region identifier 112 determines a detection range 103 with its distance from the three-dimensional sensor 110 being within a predetermined range, and further determines a plurality of reference regions 131 at different positions within the detection range 103. The plurality of reference regions 131 are determined so as to have the same or almost the same area.

In the case of the present preferred embodiment, the reference region identifier 112 identifies, as the detection range 103, a fan-shaped arch (a Baumkuchen type) being a portion of a portion obtained by radially cutting off a region sandwiched by two concentric circles such that a distance from an intermediate position (a sensor origin) of the two three-dimensional sensors 110 is within a predetermined range. That is, the detection range 103 with its distance from the three-dimensional sensor 110 being within the predetermined range is a region sandwiched between an arc of a first distance from the three-dimensional sensor 110 and an arc of a second distance longer than the first distance on the plane orthogonal to the visual field plane 199.

The reference region identifier 112 may determine a plurality of detection ranges 103 having different distances so as to cover the entire flat portion 301.

Further, the reference region identifier 112 determines a reference region 131 so as to evenly divide the detection range 103 in the flat portion 301.

In FIG. 4, an area obtained by evenly dividing the detection range 103 into three regions is the reference region 131, but the number of reference regions 131 may be more than three as long as it is two or more. Further, the number of divisions may be determined by the number of the boxes 312 or the like of the detection target 300 in the X-axis direction.

Figure 6:
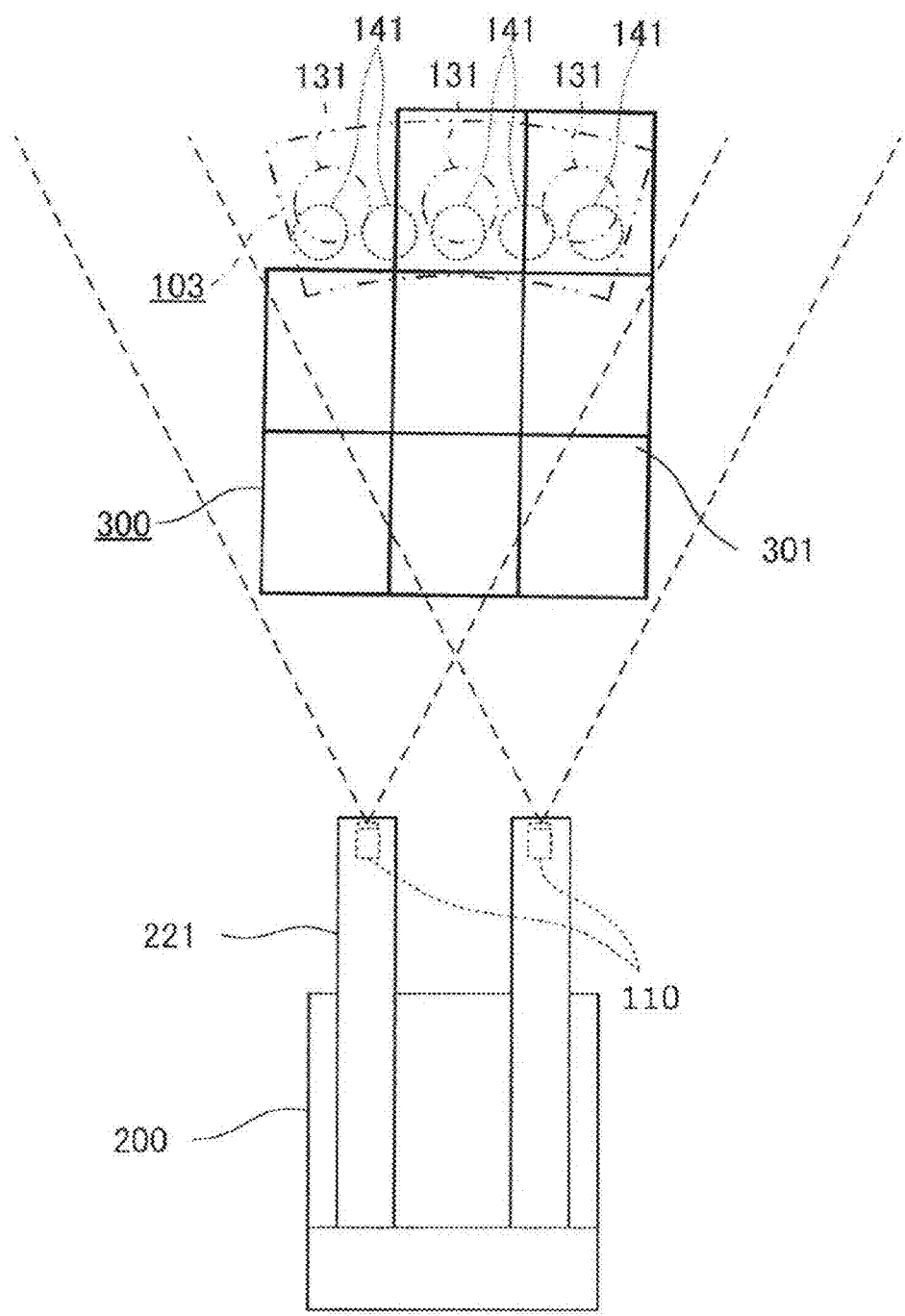
FIG. 6 is a view for describing a reference region and a comparison region according to another aspect.

Moreover, as illustrated in FIG. 4, the reference regions 131 may not only be disposed in a contact state while delimiting the detection range 103, but may be set at separate positions as illustrated in FIG. 6.

Here, the reference region identifier 112 may further be configured or programmed to include a flat portion identifier 115 that acquires distance image information of a parallel portion 303 (cf. FIGS. 1 and 3), which is a portion of the detection target 300 along the visual field plane 199 of the three-dimensional sensor 110, together with or separately from the flat portion 301 before decision of the detection range 103 and identifies the position of the flat portion 301 from the distance image information including the information of the parallel portion 303.

Specifically, based on the length and the angle of the boundary (edge) between the flat portion 301 and the parallel portion 303, the size of the pallet 311 included in the parallel portion 303, the size of the holes, the distance between the two holes, and the like, the flat portion identifier 115 predictively identifies the shape of the portion 301.

Figure 7:
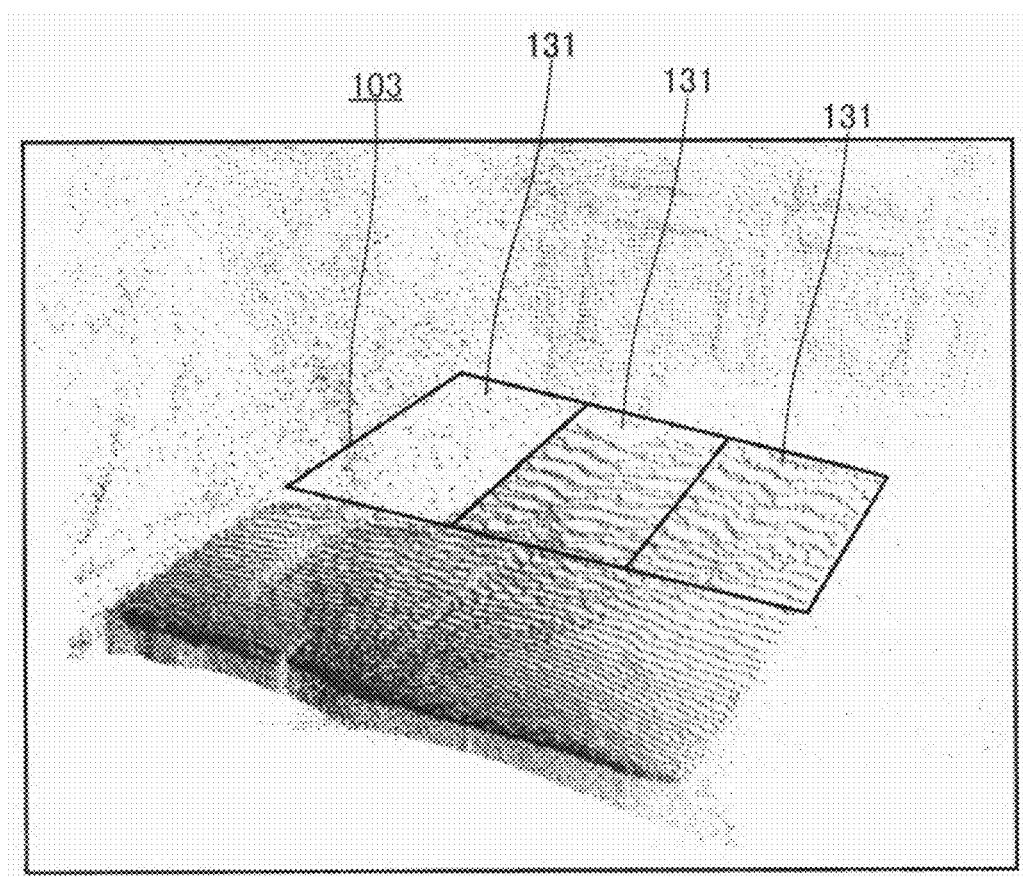
FIG. 7 is a view for describing a detection range, a reference region, and a comparison region determined by identifying the shape of the flat portion.

As illustrated in FIG. 7, the reference region identifier 112 may determine the detection range 103 and determine the reference region 131 based on an identification result of the flat portion identifier 115.

The reference information extractor 113 extracts, from the distance image information, reference information corresponding to each of the plurality of reference regions 131 determined in the reference region identifier 112.

In the case of the present preferred embodiment, the number of pieces of point information included in the reference region 131 is extracted as reference information.

The reference value calculator 114 statistically processes the reference information corresponding to each reference region 131 extracted by the reference information extractor 113 to determine a reference value.

In the case of the present preferred embodiment, the reference value calculator 114 calculates the number of pieces of point information included in each reference region 131, namely, an average of densities of points, and sets this as a reference value.

The presence identification processor 102 is a processor that is configured or programmed to determine whether or not the recess 302 is present based on the reference value determined by the reference value decision processor 101 and when determining that at least the recess 302 is present, presents the presence of the recess 302. The presence identification processor 102 is configured or programmed to include a comparison region determiner 122, a comparison information extractor 123, and a recess determiner 124. It is also possible for each of the comparison region determiner 122, the comparison information extractor 123, and the recess determiner 124 to be defined by a separate processor or processors independent from the presence identification processor 102.

The comparison region determiner 122 determines a plurality of comparison regions 141 at different positions within the detection range 103 determined by the reference region identifier 112 of the reference value decision processor 101. Since the comparison regions 141 are regions used to determine the presence or absence of the recess 302, it is preferable to determine the comparison regions 141 as widely and uniformly as possible within the detection range 103.

In the case of the present preferred embodiment, the plurality of comparison regions 141 are determined so as to have the same or almost the same area, and as illustrated in FIG. 4, the reference region 131 and the comparison region 141 coincide with each other.

Note that the comparison region 141 does not necessarily coincide with the reference region 131, but may be determined to be a region different from the reference region 131 as illustrated in FIG. 6.

The comparison information extractor 123 extracts from the distance image information a plurality of pieces of comparison information respectively corresponding to the plurality of comparison regions 141 determined in the comparison region determiner 122.

In the case of the present preferred embodiment, the number of pieces of point information included in the comparison region 141 is extracted as comparison information. Further, in the case of the present preferred embodiment, since the reference region 131 and the comparison region 141 coincide with each other, the comparison information extractor 123 uses the reference information extracted by the reference information extractor 113 as the comparison information.

The recess determiner 124 derives each comparison value based on the comparison information extracted by the comparison information extractor 123, derives a difference between the reference value determined by the reference value decision processor 101 and each comparison value. When there is a reference value with its difference from the reference value exceeding a predetermined threshold, the recess determiner 124 presents that the recess 302 is present in the comparison region 141 from which the comparison value has been derived. Although the method is not particularly limited, for example, information indicating that the recess 302 is present may be output to another controller or the like, or may be indicated by sound, light, video, or the like.

Next, operation of the recess detection device 100 and the transport device 200 including the recess detection device 100 will be described.

Figure 8:
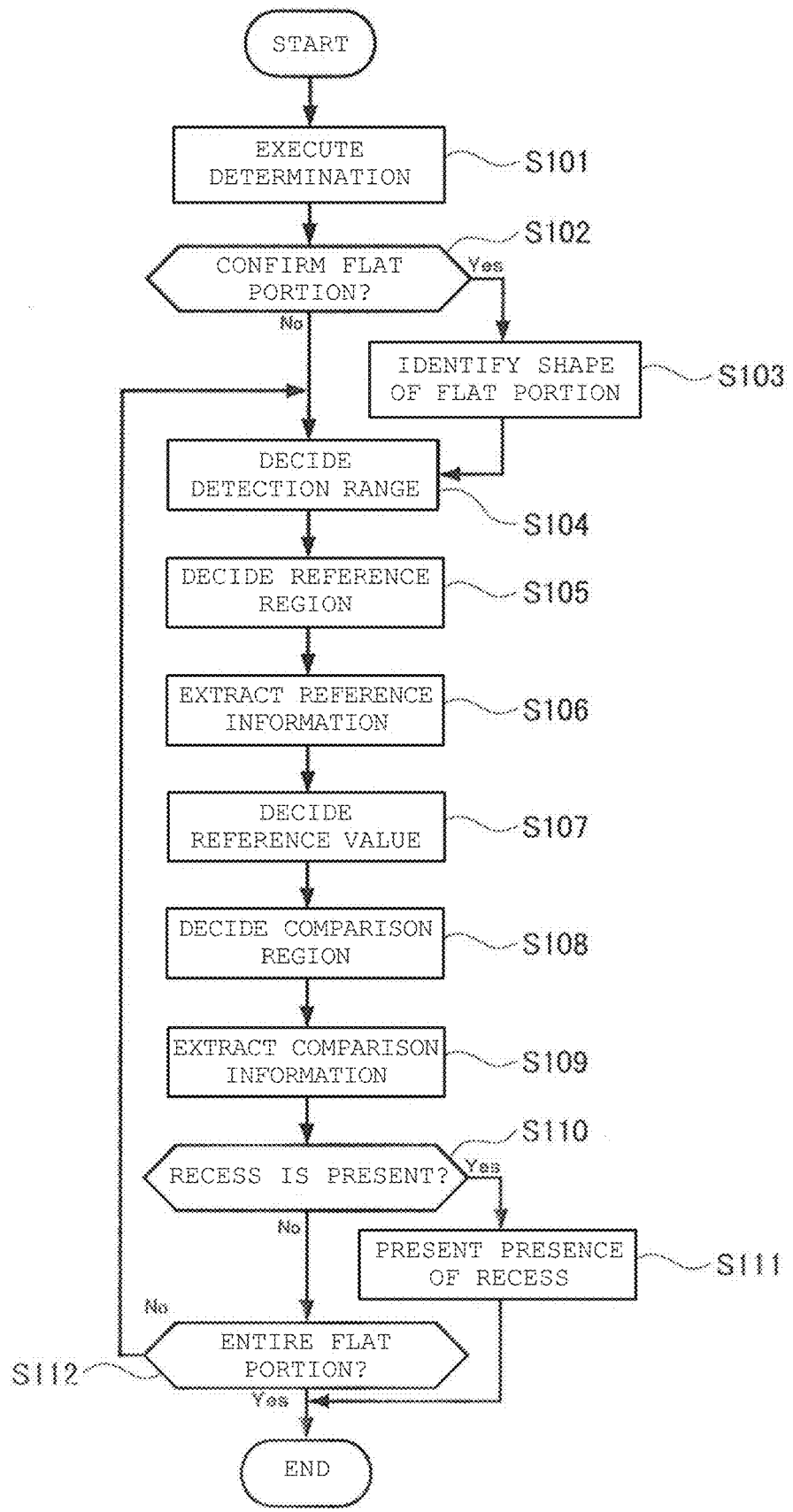
FIG. 8 is a flowchart illustrating operation of the recess detection device and the transport device including the recess detection device.

FIG. 8 is a flowchart illustrating operation of the recess detection device and the transport device including the recess detection device.

When the transport device 200 in the state of holding the placement target 310 is determined to have approached the detection target 300 based on the position of the detection target 300 provided in advance and its own position, it is determined whether or not the recess 302 is present in the flat portion 301 of the detection target 300 (S101).

Next, it is determined whether or not the parallel portion 303 needs to be confirmed. For example, when the transport device 200 is disposed in front of the detection target 300 provided in advance, it is determined that the parallel portion 303 is not to be confirmed, and when a relative orientation between the detection target 300 and the transport device 200 is oblique, it is determined that the parallel portion 303 is to be confirmed (S102). This determination is an example, and other determination criteria may be present.

Next, when the parallel portion 303 is to be confirmed (S102: Yes), the position of the three-dimensional sensor 110 is lowered by lowering the holder 202, or the current position of the three-dimensional sensor 110 is held, to acquire distance image information including the parallel portion 303.

Based on the obtained distance image information, the reference region identifier 112 identifies the position of the flat portion 301 (S103). Further, the reference region identifier 112 may also identify the orientation of the flat portion 301 with respect to the transport device 200.

Next, when the shape of the flat portion 301 has been identified, the reference region identifier 112 determines the detection range 103 with its distance from the three-dimensional sensor 110 being within a predetermined range, based on the identified flat shape (S104). On the other hand, when the shape of the flat portion 301 has not been identified, the reference region identifier 112 determines a predetermined region with its distance from the three-dimensional sensor 110 being within the predetermined range as the detection range 103 (S104).

Next, the reference region identifier 112 determines the reference region 131 at a plurality of places within the determined detection range 103 (S105).

Subsequently, the reference information extractor 113 extracts reference information on each of the determined reference regions 131 (S106).

Based on the extracted reference information, the reference information extractor 113 determines as the reference value an average of the numbers of pieces of point information being the reference information within the reference region 131 (S107).

Next, within the detection range 103 determined in the detection range decision step (S104), the comparison region determiner 122 determines the comparison region 141 at a plurality of places (S108). In the case of the present preferred embodiment, the reference region 131 is determined as the comparison region 141.

Next, for each of the determined comparison regions 141, the comparison information extractor 123 extracts the comparison information (S109).

Then, the recess determiner 124 sequentially derives the comparison value for each comparison region 141 based on the extracted comparison information, derives a difference between the comparison value and the reference value in the derivation order, and repeatedly determines whether or not the obtained difference exceeds the predetermined threshold until the difference exceeds the threshold (S110: Yes). When the difference exceeds the threshold, the recess determiner 124 presents that the recess 302 is present (S111) and terminates the process. On the other hand, when there is no comparison region 141 with its difference exceeding the threshold, the recess determiner 124 determines that there is no recess 302 within the detection range 103, and the process proceeds to the next process (S110: No).

Figure 9:
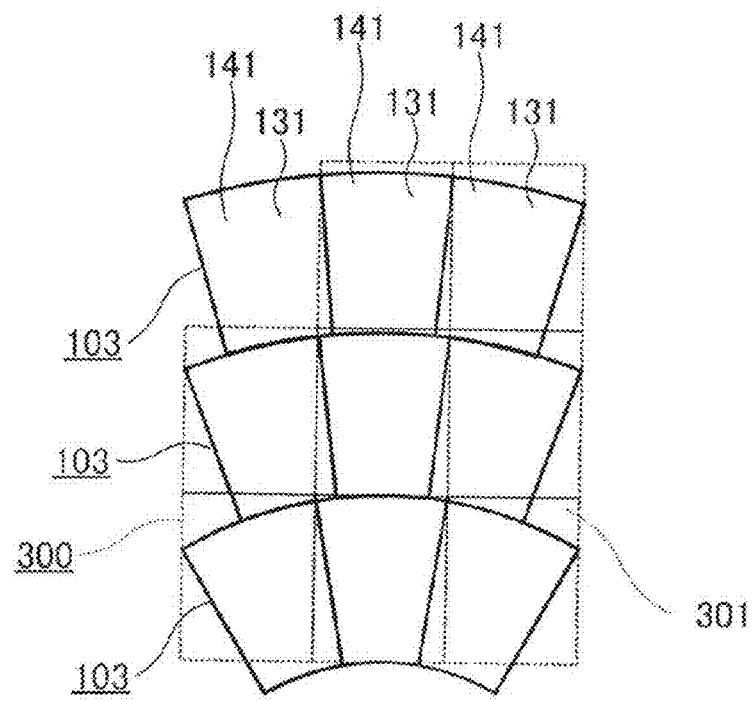
FIG. 9 is a view illustrating one example of a determined state of a detection range to cover the flat portion.

Next, it is determined whether or not the entire flat portion 301 of the detection target 300 has been covered by the plurality of detection ranges 103 as illustrated in FIG. 9 (S112), and when the entire flat portion 301 has not been covered (S112: No), the process returns to the detection range decision step (S104). In this case, the reference region identifier 112 determines, as the detection range 103, a region with its distance from the three-dimensional sensor 110 being within a predetermined range, the region being other than the previously determined detection range 103. On the other hand, when the entire flat portion 301 has been covered (S112: Yes), the reference region identifier 112 terminates the process.

According to the recess detection device 100 and the recess detecting method using the recess detection device 100 according to the present preferred embodiment, the distance information is removed from the distance image information obtained from the three-dimensional sensor 110, and the presence or absence of the recess 302 is determined based on two-dimensional point information, such that it is possible to detect the recess 302 at relatively high speed. Hence, the transport device 200 or the like in which the presence of the recess 302 is indicated is able to stop placing the placement target 310 on the flat portion 301 of the detection target 300 to avoid danger or problems such as a load collapse.

When the recess 302 is present within the flat portion 301, if there is no object which reflects light emitted by the three-dimensional sensor 110 within the recess 302, the three-dimensional sensor 110 indicates an invalid value or the presence of the recess 302 often appears as noises. In the three-dimensional sensor 110, the density of detectable point information decreases with increasing distance from the three-dimensional sensor 110. Therefore, it is difficult to determine that the recess 302 is present in a portion far from the three-dimensional sensor 110 only because the density of the point information in the detection range 103 far from the three-dimensional sensor 110 is lower than the density of point information in the detection range 103 close to the three-dimensional sensor 110. Especially when the points of the recess 302 appear as noises, the density of noises on the front side of the recess 302 may be higher than the density of a point group on the rear-side plane, and hence it is not possible to determine the presence of the recess 302 with a threshold of a certain density.

Therefore, the present preferred embodiment determines the detection range 103 with its distance from the three-dimensional sensor 110 being within a predetermined range, dynamically generates a reference value based on a measurement value within the detection range 103 to cancel the influence by noises, and cancels the influence by a density change depending on the distance from the three-dimensional sensor 110. Accordingly, it is determined whether or not the recess 302 is present in the same detection range 103 based on the reference value to enable detection of the recess 302 with high accuracy.

As described above, even when the three-dimensional sensor 110 and the detection target 300 are far from each other, it is possible to detect the recess 302 present in the flat portion 301 of the detection target 300. Thus, for example by detecting the recess 302 before the transport device 200 approaches the detection target 300, it is possible to omit unnecessary operation such as the transport device 200 transporting the placement target 310 above the detection target 300.

The present invention is not limited to the above preferred embodiments. For example, another preferred embodiment, realized by combining the elements and/or features described in the present specification in a freely selected manner and excluding some of the elements and/or features, may be taken as a preferred embodiment of the present invention. Further, an alternative modification, obtained by applying to the above preferred embodiments a variety of modifications that may be conceived by those skilled in the art within the scope not deviating from the gist of the present invention, namely, the meanings indicated by the wording in the claims, is also included in the present invention.

Figure 10:
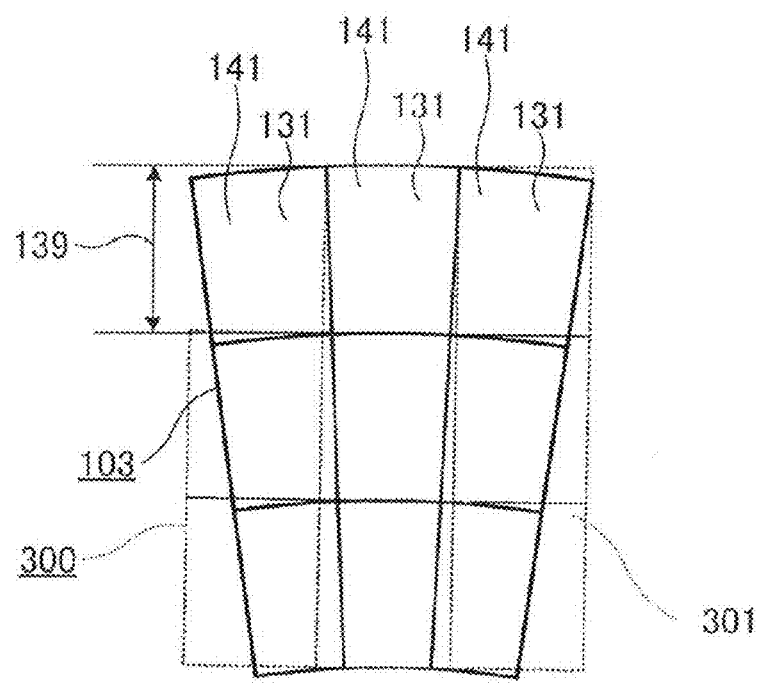
FIG. 10 is a view illustrating an example of another determined state of the detection range to cover the flat portion.

The shape and the like of the detection range 103 are not particularly limited, and as illustrated in FIG. 10, when it is possible to cover almost the entire flat portion 301 with one large fan-shaped dome, this large fan-shaped dome may be radially divided into a plurality of portions and set as the detection ranges 103. A radial length 139, which is a length in a radial direction of the detection range 103, may be the same among the detection ranges 103, or may be varied in accordance with a tan function using a distance from a concentric circle as a parameter, for example.

Although each of the reference value and the comparison value has been described as the density of the point information, the present invention is not limited thereto, and the reference value may be calculated by, for example, using a ratio of the number of points within the reference region 131 with respect to the total number of points within the detection range 103. In this case, the comparison value is also a ratio of the number of points within the comparison region 141 with respect to the total number of points within the detection range 103.

Although the reference value has been described as the average value, the reference value may be a maximum value, a minimum value, a median value, or the like, or a standard deviation or the like may be used.

Further, although the detection target 300 and the placement target 310 have been described as the same object, the detection target 300 and the placement target 310 are not limited thereto. For example, when the transport device 200 is a device that arranges loads such as boxes one by one in a matrix within a horizontal plane, a set of loads previously arranged within the horizontal plane is the detection target, and each of boxes arranged on the detection target 300 is the placement target 310.

Although the case has been described in which the presence of the recess 302 is indicated only when the recess 302 is present, the absence of the recess 302 may be indicated. When the recess 302 is present, information such as the size of the recess 302 and its position in the flat portion 301 may be indicated or presented. In this case, it may be determined whether or not to place the placement target 310 on the flat portion 301 of the detection target 300 based on the position and the size of the recess 302. For example, when the recess 302 is present in the corner portion as in the above preferred embodiment, the placement of the placement target 310 may be stopped due to a lack of stability, and when the recess 302 is present only in the central portion of the flat portion 301, the placement of the placement target 310 may be executed.

Further, not only in the case of detecting the recess 302 for the entire flat portion 301 as in the above preferred embodiments, the recess 302 may be detected by using the recess detection device 100 and the recess detecting method only for a portion far from the three-dimensional sensor 110 in the flat portion 301, and the recess 302 may be detected for a near portion with relatively a little noise by another method.

Preferred embodiments of the present invention are useful as transport devices, such as cranes, capable of placing a load in a flat portion where a recess may occur.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A recess detection device for detecting a recess in a flat portion intersecting with a visual field plane of a three-dimensional sensor, based on distance image information of a detection target including the flat portion, the recess detection device comprising:
   a reference value decision processor that extracts, from the distance image information, a plurality of pieces of reference information respectively corresponding to a plurality of reference regions located at different positions within a detection range with a distance from the three-dimensional sensor being within a predetermined range, and determines a reference value based on the plurality of pieces of reference information; and
   a presence identification processor that extracts, from the distance image information, pieces of comparison information respectively corresponding to a plurality of comparison regions within the detection range, derives comparison values based on the respective pieces of comparison information, and indicates a presence of a recess when a difference between the reference value and the comparison value exceeds a predetermined threshold; wherein
   the detection target is a pallet with one or more boxes stacked on the pallet in a cubic or substantially cubic shape; and
   the flat portion is an upper surface of the detection target.

2. The recess detection device according to claim 1, wherein the plurality of reference regions are evenly disposed along the detection range.

3. The recess detection device according to claim 1, wherein the plurality of reference regions are regions obtained by evenly dividing the detection range.

4. The recess detection device according to claim 1, wherein each of the plurality of reference regions and each of the plurality of comparison regions are the same region.

5. The recess detection device according to claim 1, wherein the reference value decision processor acquires distance image information of a parallel portion that is a portion of the detection target along the visual field plane of the three-dimensional sensor, and identifies a shape of the flat portion from the distance image information.

6. A transport device comprising:
   a recess detection device that detects a recess in a flat portion intersecting with a visual field plane of a three-dimensional sensor, based on distance image information of a detection target including the flat portion;
   the recess detection device including:
   a reference value decision processor that extracts, from the distance image information, a plurality of pieces of reference information respectively corresponding to a plurality of reference regions located at different positions within a detection range with a distance from the three-dimensional sensor being within a predetermined range, and determines a reference value based on the plurality of pieces of reference information; and a presence identification processor that extracts, from the distance image information, pieces of comparison information respectively corresponding to a plurality of comparison regions within the detection range, derives comparison values based on the respective pieces of comparison information, and indicates a presence of a recess when a difference between the reference value and the comparison value exceeds a predetermined threshold;

a vehicle, to which the recess detection device is attached, and which moves autonomously; and a holder that is attached to the vehicle and holds a placement target placed on the detection target; wherein the detection target is a pallet with one or more boxes stacked on the pallet in a cubic or substantially cubic shape; and the flat portion is an upper surface of the detection target.

7. The transport device according to claim 6, wherein the holder includes a plurality of forks;

the recess detection device includes a plurality of three-dimensional sensors; and each of the plurality of three-dimensional sensors is attached to each of tips of the forks and attempts to detect a recess.

8. The transport device according to claim 6, wherein the plurality of reference regions are evenly disposed along the detection range.

9. The transport device according to claim 6, wherein the plurality of reference regions are regions obtained by evenly dividing the detection range.

10. The transport device according to claim 6, wherein each of the plurality of reference regions and each of the plurality of comparison regions are the same region.

11. The transport device according to claim 6, wherein the reference value decision processor acquires distance image information of a parallel portion that is a portion of the detection target along the visual field plane of the three-dimensional sensor, and identifies a shape of the flat portion from the distance image information.

12. A recess detecting method for detecting a recess in a flat portion intersecting with a visual field plane of a three-dimensional sensor, based on distance image information of a detection target including the flat portion, the recess detecting method comprising:

causing a reference value decision processor to extract, from the distance image information, a plurality of pieces of reference information respectively corresponding to a plurality of reference regions located at different positions within a detection range in the flat portion with a distance from the three-dimensional sensor being within a predetermined range;

causing the reference value decision processor to determine a reference value based on the plurality of pieces of reference information;

causing a presence identification processor to extract, from the distance image information, pieces of comparison information respectively corresponding to a plurality of comparison regions within the detection range in the flat portion;

causing the presence identification processor to derive comparison values based on the respective pieces of comparison information; and causing the presence identification processor to indicate a presence of a recess when a difference between the reference value and the comparison value exceeds a predetermined threshold; wherein the detection target is a pallet with one or more boxes stacked on the pallet in a cubic or substantially cubic shape; and the flat portion is an upper surface of the detection target.

13. The recess detecting method according to claim 12, wherein the plurality of reference regions are evenly disposed along the detection range.

14. The recess detecting method according to claim 12, wherein the plurality of reference regions are regions obtained by evenly dividing the detection range.

15. The recess detecting method according to claim 12, wherein each of the plurality of reference regions and each of the plurality of comparison regions are the same region.

16. The recess detecting method according to claim 12, wherein the reference value decision processor acquires distance image information of a parallel portion that is a portion of the detection target along the visual field plane of the three-dimensional sensor, and identifies a shape of the flat portion from the distance image information.

* * * * *